F. B. HARRIS.
Egg-Testers.

No. 205,547. Patented July 2, 1878.

WITNESSES:
Chas. Nida
J. H. Scarborough

INVENTOR:
F. B. Harris.
BY Munn & Co
ATTORNEYS.

UNITED STATES PATENT OFFICE.

FRED. B. HARRIS, OF BATAVIA, NEW YORK, ASSIGNOR OF ONE-HALF HIS RIGHT TO ADIN G. GAGE, OF SAME PLACE.

IMPROVEMENT IN EGG-TESTERS.

Specification forming part of Letters Patent No. 205,547, dated July 2, 1878; application filed October 29, 1877.

*To all whom it may concern:*

Figure 1:
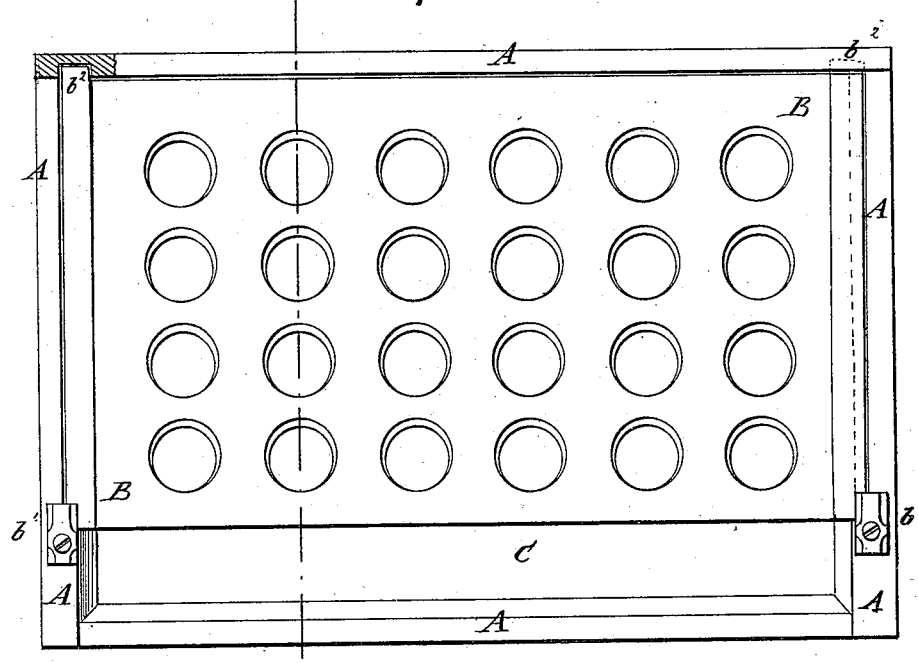
Figure 2:
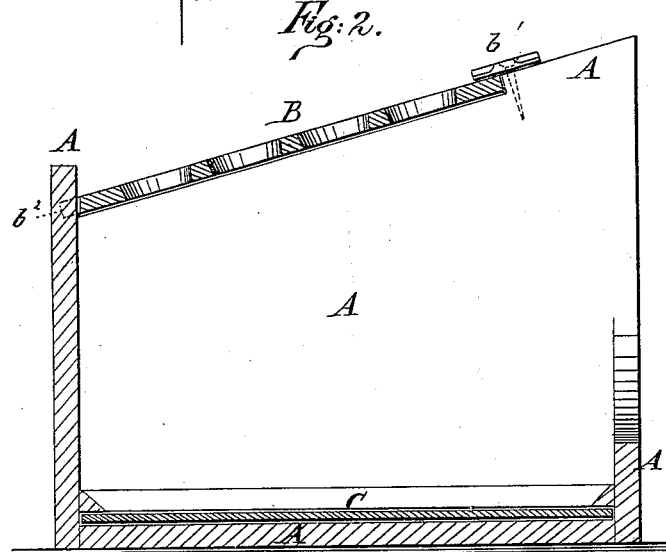

Be it known that I, FRED. B. HARRIS, of Batavia, in the county of Genesee and State of New York, have invented a new and useful Improvement in Egg-Testers, of which the following is a specification:

Figure 1 is a top view of my improved device. Fig. 2 is a cross-section of the same, taken through the line $x$ $x$, Fig. 1.

Similar letters of reference indicate corresponding parts.

The object of this invention is to furnish an improved device for testing eggs, which shall be simple in construction and convenient and reliable in use, enabling the eggs to be tested rapidly, and the bad ones unfailingly distinguished.

The invention will first be described in connection with the drawing, and then pointed out in claim.

A is a rectangular box, of any desired size, the forward side of which is made the higher, and is mostly cut away to give an unobstructed view of the bottom of said box.

B is the top of the box, the ends of which rest in rabbets in the inclined top edges of the ends of said box, and which is secured in place by buttons $b^1$, pivoted to the edges of the ends of the box A, and by toes $b^2$ upon its lower edge, and which enter recesses in the rear side of said box.

The top B may be permanently attached to the box A, if desired; but I prefer to make it detachable, to enable the box to be cleaned more readily when desired.

In the top B are formed a number of holes, of such a size as to receive and hold the eggs, but which will not allow said eggs to pass through. In the bottom of the box A is secured a mirror or reflector, C.

With this construction, when eggs are placed in the holes of the top B and exposed to the light, the reflection from the reflector C will show at a glance whether the said eggs be good or bad, the reflection from the good eggs being light, and that from the bad eggs being dark.

Having thus described my invention, I claim as new and desire to secure by Letters Patent—

An egg-tester in which the mirror is arranged horizontally on the bottom, the egg-holder inclined, and the larger end of the box left open, as shown and described.

FRED. B. HARRIS.

Witnesses:
JAMES T. GRAHAM,
C. SEDGWICK.